US012656276B2

(12) United States Patent
Rothe et al.

(10) Patent No.: US 12,656,276 B2
(45) Date of Patent: Jun. 16, 2026

(54) HIGH RESOLUTION COMPUTED TOMOGRAPHY OBJECT SCANNING

(71) Applicant: Baker Hughes Holdings LLC, Houston, TX (US)

(72) Inventors: Nils Rothe, Zwenkau (DE); Alexander Suppes, Garbsen (DE)

(73) Assignee: Baker Hughes Holdings LLC, Houston, TX (US)

( * ) Notice: Subject to any disclaimer, the term of this patent is extended or adjusted under 35 U.S.C. 154(b) by 392 days.

(21) Appl. No.: 18/363,789

(22) Filed: Aug. 2, 2023

(65) Prior Publication Data

US 2024/0102947 A1      Mar. 28, 2024

Related U.S. Application Data

(60) Provisional application No. 63/410,428, filed on Sep. 27, 2022.

(51) Int. Cl.
G01N 23/046      (2018.01)
G06T 7/60      (2017.01)
(Continued)

(52) U.S. Cl.
CPC ............. G01N 23/046 (2013.01); G06T 7/60 (2013.01); G06T 7/73 (2017.01); G06T 17/00 (2013.01);
(Continued)

(58) Field of Classification Search
CPC ......... G06T 7/73; G06T 17/00; G06T 11/005; G06T 7/60; G06T 2207/10081;
(Continued)

(56) References Cited

U.S. PATENT DOCUMENTS

| | | |
|---|---|---|
| 5,023,895 A | 6/1991 | Mccroskey et al. |
| 5,032,990 A | 7/1991 | Eberhard et al. |

(Continued)

FOREIGN PATENT DOCUMENTS

WO      2011091070 A2      7/2011

OTHER PUBLICATIONS

International Search Report and Written Opinion Received for PCT Patent Application No. PCT/US2023/074858, mailed on Jan. 18, 2024, 11 pages.

(Continued)

*Primary Examiner* — Irakli Kiknadze
(74) *Attorney, Agent, or Firm* — Mintz, Levin, Cohn, Ferris, Glovsky and Popeo, P.C.

(57)      ABSTRACT

A method for scanning a target object is provided. The method includes generating a scanning path including source poses at which a target object is scanned by a scanning source. The method also includes moving the target object along the scanning path and emitting a beam towards a region of interest (ROI) on the target object at each source pose. The method further includes receiving data characterizing the ROI based on the emitted beam and generating scanning data representing a geometrical position and an orientation of the ROI of the target object for each source pose. Pose information can be extracted based on the source poses and a 3D model of the target object can be reconstructed using the pose information and the scanning data and provided for display. Related systems and non-transitory computer readable mediums are also provided.

20 Claims, 5 Drawing Sheets

(51) Int. Cl.
 G06T 7/73 (2017.01)
 G06T 17/00 (2006.01)
(52) U.S. Cl.
 CPC ................ *G01N 2223/3303* (2013.01); *G06T 2207/10081* (2013.01)
(58) Field of Classification Search
 CPC ............. G06T 11/006; G06T 2211/424; G06T 2211/436; G06T 7/0012; G06T 2207/20081; G06T 11/008; G06T 15/20; G06T 7/10; G06T 15/04; G06T 19/006; G06T 7/344; G06T 7/251; G06T 7/33; G06T 2207/10088; G06T 2207/10121; G06T 2207/30012; G06T 2207/30204; G06T 2207/10064; G06T 19/00; G06T 2210/41; G06T 7/0004; G06T 2207/30108; G06T 2207/10112; G06T 2207/30024; G06T 2207/10124; G06T 2207/10024; G06T 12/10; G01N 23/046; G01N 2223/3303; G01N 2223/643; G01N 2223/419; G01N 2223/401; G01N 2223/408; G01N 23/04; G01N 2223/639; G01N 23/223; G01N 23/2206; G01N 2223/1016; G01N 2223/076; G01N 33/46; G01N 2223/619; G01N 2223/631; G01N 23/083; G01N 23/044; G01N 2223/601; G01N 2223/206; G01N 2223/3302; G01N 2223/405; G01N 2223/03; G01N 2223/04; A61N 5/1067; A61N 5/1081; A61N 2005/1061; A61N 2005/1054; A61N 5/107; A61N 5/1049; A61N 5/1039; A61N 2005/1074; A61N 5/1038; A61N 5/1031; A61N 5/1071; A61B 6/541; A61B 6/032; A61B 6/5241; A61B 6/5235; A61B 6/5205; A61B 6/027; A61B 6/4441; A61B 6/469; A61B 6/465; A61B 6/025; A61B 6/5223; A61B 6/481; A61B 6/505; A61B 90/37; A61B 6/5294; A61B 6/102; A61B 6/547; A61B 6/462; A61B 6/46; A61B 34/10; A61B 6/542; A61B 6/548; A61B 2034/107; A61B 2090/502; A61B 34/25; A61B 2034/2055; A61B 2017/00207; A61B 2034/2048; A61B 2090/3764; A61B 2034/2065; A61B 2034/2068; A61B 2090/378; A61B 2090/372; A61B 2090/365; A61B 2090/3762; A61B 2017/00221; A61B 2090/374; A61B 2090/376; A61B 90/39; A61B 10/0283; A61B 34/20; A61B 10/025; A61B 2090/397; A61B 2010/0258; A61B 2090/3966; A61B 2034/2072; A61B 2034/2051; A61B 6/08; A61B 6/4476; A61B 6/0407; A61B 6/488; A61B 6/04; A61B 6/5247; A61B 6/461; A61B 6/502; A61B 6/4258; A61B 6/4405; A61B 6/508; A61B 6/4417; A61B 6/54; A61B 6/4014; A61B 6/4435; A61B 6/50; A61B 6/482; A61B 6/466; A61B 6/4064; A61B 6/035; A61B 6/4411; A61B 6/589; A61B 6/504; G16H 30/40; G16H 30/20; G16H 40/67; G06F 3/0346; G06F 3/04815; G06F 3/016; G06F 3/012; G06F 3/017; G06F 3/013; G02B 27/0172; G02B 27/017; G02B 2027/0134; G02B 2027/0141; G02B 2027/014; G02B 2027/0138; G06V 20/64; H04N 23/60; H04N 5/272; H04N 23/30; G01V 5/22; G01V 5/20
 USPC .................................................. 378/19, 4, 62
 See application file for complete search history.

(56) References Cited

U.S. PATENT DOCUMENTS

| | | | |
|---|---|---|---|
| 5,138,642 A | 8/1992 | McCroskey et al. | |
| 5,822,392 A | 10/1998 | Hedengren | |
| 6,061,086 A | 5/2000 | Reimer et al. | |
| 8,094,773 B2 * | 1/2012 | Boese .................... | A61B 6/025 378/4 |
| 8,303,181 B2 * | 11/2012 | Sukovic ................. | A61B 6/547 378/197 |
| 8,971,484 B2 | 3/2015 | Beckmann et al. | |
| 9,025,855 B1 | 5/2015 | Christoph et al. | |
| 9,086,497 B2 | 7/2015 | Bendahan | |
| 9,974,493 B2 * | 5/2018 | Kim ......................... | A61B 6/04 |
| 10,209,204 B2 | 2/2019 | Mecke et al. | |
| 10,242,842 B2 | 3/2019 | Man et al. | |
| 10,353,191 B2 | 7/2019 | Anthony et al. | |
| 10,722,192 B2 * | 7/2020 | Erler .................... | G01N 23/046 |
| 10,735,674 B2 | 8/2020 | Anthony et al. | |
| 10,779,789 B2 * | 9/2020 | Koehler .............. | G01N 23/046 |
| 10,859,515 B2 * | 12/2020 | Huang ................. | G01N 23/087 |
| 11,022,569 B2 | 6/2021 | Kang et al. | |
| 2007/0003003 A1 | 1/2007 | Seppi et al. | |
| 2014/0270059 A1 | 9/2014 | Suppes et al. | |
| 2014/0285818 A1 | 9/2014 | Holz | |
| 2014/0368500 A1 * | 12/2014 | O'Hare .................. | G01B 15/04 345/420 |
| 2017/0108453 A1 | 4/2017 | Foland et al. | |
| 2018/0328866 A1 | 11/2018 | Kang et al. | |
| 2020/0138394 A1 * | 5/2020 | Vanden Berghe ..... | G16H 50/30 |
| 2020/0309719 A1 | 10/2020 | Howard et al. | |
| 2021/0172879 A1 | 6/2021 | Chen et al. | |

OTHER PUBLICATIONS

Helfen et al., "High-Resolution Three-Dimensional Imaging of Flat Objects by Synchrotron-Radiation Computed Laminography", Applied Physics Letters, Feb. 2005, 86(7):071915/3, 4 pages.
Voland et al., "High-Resolution Computed Tomography of Large or Heavy-Weight Objects", 5th International Symposium on NDT in Aerospace, Nov. 13-15, 2013, 10 pages.
Variable Zoom Technique for X-Ray Computed Tomography; DOI:10.1016/j.ndteint.2020.102310; Online publication date Jun. 12, 2020; https://www.sciencedirect.com/science/article/am/pii/S0963869520302.†

\* cited by examiner
† cited by third party

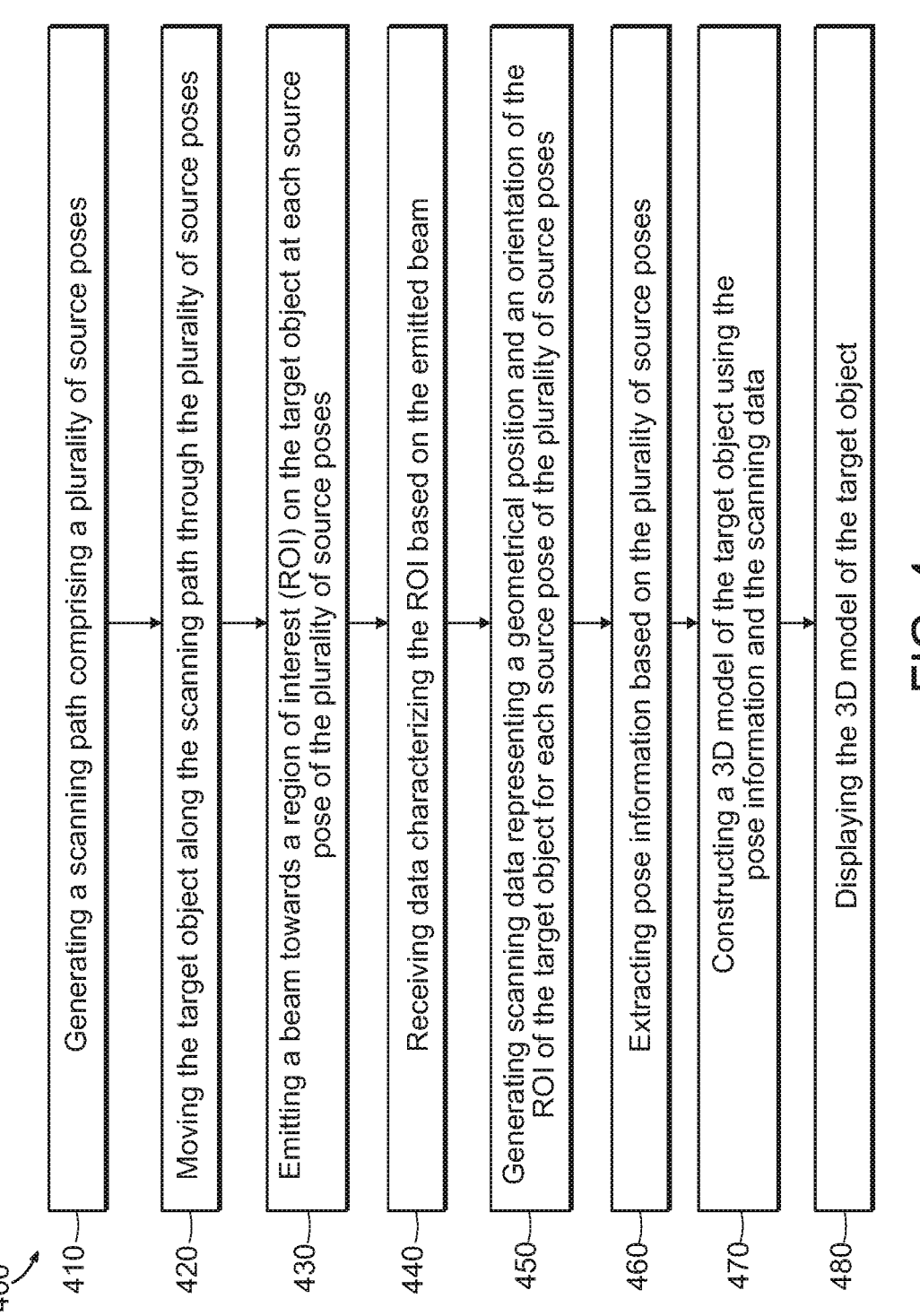

400

410 Generating a scanning path comprising a plurality of source poses

420 Moving the target object along the scanning path through the plurality of source poses 430 Emitting a beam towards a region of interest (ROI) on the target object at each source pose of the plurality of source poses 440 Receiving data characterizing the ROI based on the emitted beam 450 Generating scanning data representing a geometrical position and an orientation of the ROI of the target object for each source pose of the plurality of source poses 460 Extracting pose information based on the plurality of source poses 470 Constructing a 3D model of the target object using the pose information and the scanning data 480 Displaying the 3D model of the target object

FIG. 4

HIGH RESOLUTION COMPUTED TOMOGRAPHY OBJECT SCANNING

CROSS-REFERENCE TO RELATED APPLICATIONS

This application claims the benefit of and priority under 35 U.S.C. § 119 to U.S. Provisional Patent Application No. 63/410,428 filed Sep. 27, 2022, the entire contents of which is hereby expressly incorporated by reference herein.

BACKGROUND

Industrial computed tomography (CT) scanning can be a process that uses irradiation to produce three-dimensional internal and external representations of a scanned object. Industrial CT scanning has been used in the industry for internal inspection of components, flaw detection, failure analysis, and assembly analysis. In conventional industrial CT scanning, an object to be scanned is placed on a rotary table between an X-ray source and a detector. By rotating the table, the object is brought into various positions relative to the source, resulting in X-rays penetrating the object from different directions. The X-rays passing through the object are attenuated, and the resulting irradiance distribution is detected by the detector. The detector produces projection images corresponding to each irradiance distribution. By applying known rotation angle positions and reconstruction methods to the acquired projection images, a 3D image of the object can be calculated.

SUMMARY

In one aspect of the present disclosure, a system is provided. In one embodiment, the system can include a scanning unit. The scanning unit can include a manipulating unit configured to generate a scanning path associated with a target object to be scanned and to move the target object along the scanning path. The scanning unit can also include a scanning source configured to emit a beam toward a region of interest (ROI) on the target object and a detector configured to receive data characterizing the ROI and to generate scanning data representing a geometrical position and an orientation of the region of interest of the target object. The system can also include a data acquisition unit communicably coupled to the scanning unit and configured to receive the scanning data. The data acquisition unit can include at least one data processor and a memory storing non-transitory computer readable instructions, which when executed by the at least one data processor cause the scanning unit to perform operations including generating, by the manipulating unit, the scanning path comprising a plurality of source poses. Each source pose can define a location at which a target object is scanned by the scanning source positioned at a first location relative to the target object. The instructions can also cause the scanning unit to move, by the manipulating unit, the target object along the scanning path through the plurality of source poses. The instructions can also cause the scanning unit to emit, by the scanning source, the beam towards a region of interest on the target object at each source pose of the plurality of source poses. The instructions can also cause the scanning unit to receive, by a detector positioned at a second location opposite the first location of the scanning source, data characterizing the ROI based on the emitted beam. The instructions can also cause the scanning unit to generate, by the detector, scanning data representing a geometrical position and an orientation of the ROI of the target object for each source pose of the plurality of source poses. The instructions can also cause the scanning unit to transmit, by the detector, the scanning data to the data acquisition unit. Responsive to receiving the transmitted scanning data, the instructions can further cause the data acquisition unit to extract, via an extracting unit of the data acquisition unit, pose information based on the plurality of source poses. The instructions can further cause the data acquisition unit to construct, by an image processor of the data acquisition unit, a 3D model of the target object using the pose information and the scanning data and to display, by a display unit of the data acquisition unit, the 3D model of the target object.

In some embodiments, the pose information can include the first location of the scanning source, the second location of the detector, a distance between the first location of the source and the second location of the detector, an orientation of the detector at the second location, and a scanning source translation-transversal distance from the target object.

In some embodiments, the plurality of source poses can be defined in a 2-dimensional plane and/or a 3-dimensional plane.

In some embodiments, the manipulating unit can be alternatively configured to move the scanning source or the detector while maintaining the target object in a third location based on one or more of an angular position of the target object relative to the scanning source, a shape of the target object, a shape of the ROI, a size of the ROI, and/or a size of the target object to be scanned.

In some embodiments, the manipulating unit can be configured to change the geometrical position and/or the orientation of the target object relative to the scanning source.

In some embodiments, the first location of the scanning source and/or the second location of the detector can be movable relative to one another.

In some embodiments, the first location of the scanning source and/or the second location of the detector can be fixed relative to one another.

In some embodiments, the scanning path can have a shape including at least one of a helical shape, a double circle shape, a circle shape, a line shape and/or an abstract shape replicating the shape of the target object.

In some embodiments, the image processor can be configured to employ a Feldkamp reconstruction algorithm to reconstruct the 3D model of the target object using the pose information.

In some embodiments, the instructions can be further configured to cause the manipulating unit to provide the generated scanning path for display via the display unit.

In another aspect of the preset disclosure, a method is provided. In one embodiment, the method can include generating, by a manipulating unit, a scanning path comprising a plurality of source poses. Each source pose can define a location at which a target object is scanned by a scanning source positioned at a first location relative to the target object. The method can also include moving, by the manipulating unit, the target object along the scanning path through the plurality of source poses. The method can further include emitting, by the scanning source, a beam towards a region of interest (ROI) on the target object at each source pose of the plurality of source poses. The method can also include receiving, by a detector positioned at a second location opposite the first location of the scanning source, data characterizing the ROI based on the emitted beam. The method can further include generating, by the detector, scanning data representing a geometrical position and an orientation of the ROI of the target object for each source pose of the plurality of source poses. The method can also include extracting, by an extracting unit, pose information based on the plurality of source poses. The method can further include constructing, by an image processor, a 3D model of the target object using the pose information and the scanning data and displaying, by a display unit, the 3D model of the target object.

In some embodiments, the pose information can include the first location of the scanning source, the second location of the detector, a distance between the first location of the source and the second location of the detector, an orientation of the detector at the second location, and a scanning source translation-transversal distance from the target object.

In some embodiments, the plurality of source poses can be defined in a 2-dimensional plane and/or a 3-dimensional plane.

In some embodiments, the manipulating unit can be alternatively configured to move the scanning source or the detector while maintaining the target object in a third location based on one or more of an angular position of the target object relative to the scanning source, a shape of the target object, a shape of the ROI, a size of the ROI, and/or a size of the target object to be scanned.

In some embodiments, the manipulating unit can be configured to change the geometrical position and/or the orientation of the target object relative to the scanning source.

In some embodiments, the first location of the scanning source and/or the second location of the detector can be movable relative to one another.

In some embodiments, the first location of the scanning source and/or the second location of the detector can be fixed relative to one another.

In some embodiments, the scanning path can have a shape including at least one of a helical shape, a double circle shape, a circle shape, a line shape and/or an abstract shape replicating the shape of the target object.

In some embodiments, the image processor can be configured to employ a Feldkamp reconstruction algorithm to reconstruct the 3D model of the target object using the pose information.

In some embodiments, the instructions can be further configured to cause the manipulating unit to provide the generated scanning path for display via the display unit.

Non-transitory computer program products (i.e., physically embodied computer program products) are also described that store instructions, which when executed by one or more processors of one or more computing systems, causes at least one processor to perform operations or methods described herein. Similarly, computer systems are also described that may include one or more processors and memory coupled to the one or more processors. The memory may temporarily or permanently store instructions that cause at least one processor to perform one or more of the operations described herein. In addition, methods can be implemented by one or more processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, or the like.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which:

FIG. 4 is an image illustrating one exemplary embodiment of a display of a scanning path for scanning a target object at high resolution provided for display by the system of FIG. 1.

Figure 1:
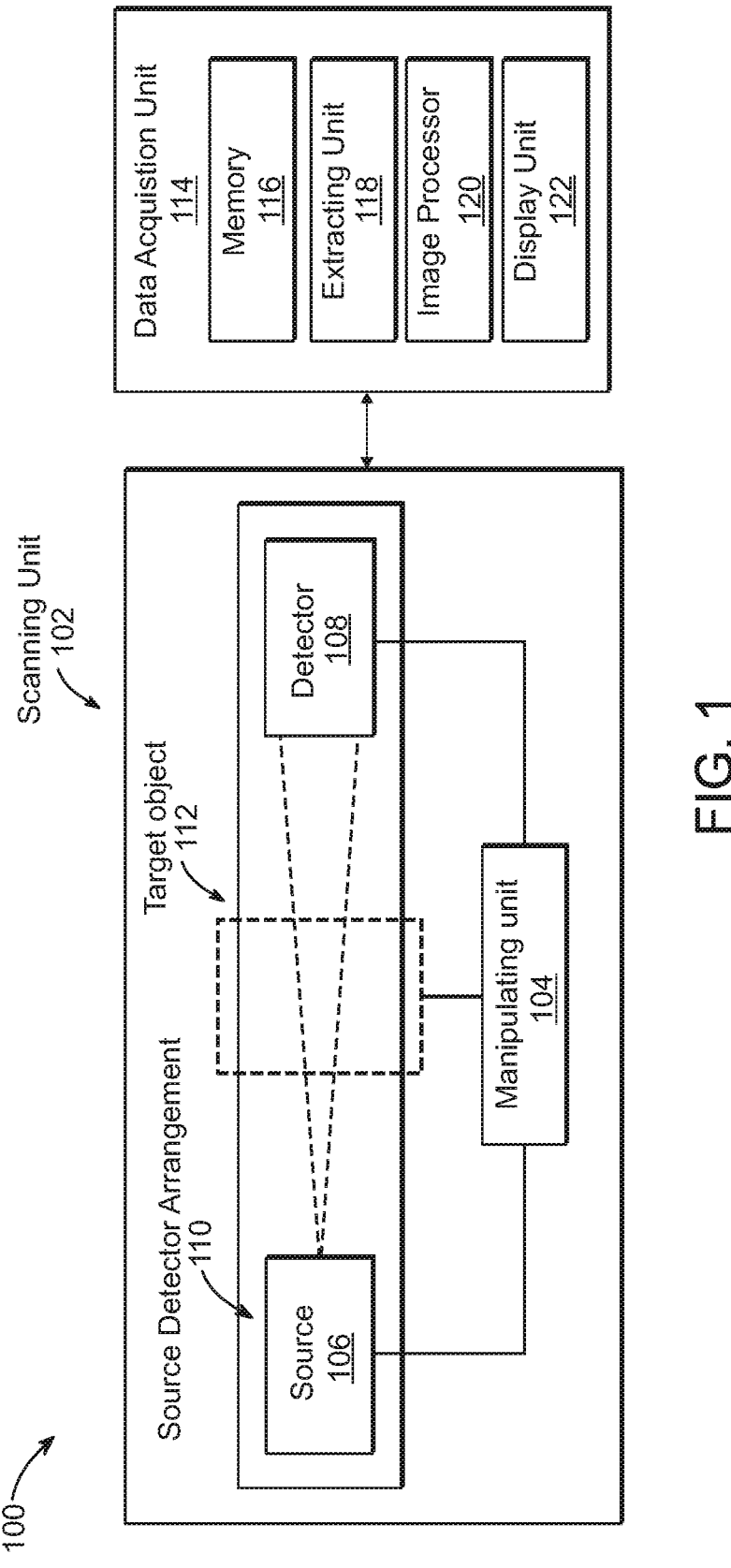
FIG. 1 is a diagram illustrating an exemplary embodiment of a system for scanning a target object at high resolution.

It is noted that the drawings are not necessarily to scale. The drawings are intended to depict only typical aspects of the subject matter disclosed herein, and therefore should not be considered as limiting the scope of the disclosure.

DETAILED DESCRIPTION

Industrial computed tomography (CT) scanning is a method of producing three-dimensional internal and external representations of a scanned object using irradiation. To obtain accurate three-dimensional representations of the scanned object, it may be required to capture a plurality of scans of the object from various angles and locations. In the known CT scanning method, a source emits signals, including, but not limited to, X-ray, radio frequency, or sonar signals, toward the object to be scanned. The emitted signals interact with the object and generate a response signal that can be received by at least one detector. The detected response signal can be used to generate an image of the object. In known CT systems, the object can be rotated with respect to the X-ray source and the detector array so that the angle at which the X-ray beam intersects the subject constantly changes. The detector produces a plurality of projection images corresponding to each rotation location of the object. The projection images can be further used to reconstruct a 3D image of the scanned object. The quality and efficiency of the reconstructed image are important to the overall effectiveness of the CT system.

However, the conventional system is prone to changes in object part geometry and misalignment of scanned object parts. In traditional CT scanning systems, the source and the detector are usually provided in fixed locations and relative to one another. In particular, to scan a small region in a big object that has a long extension in one direction(s) and a short extension in the other direction (like electronic boards (PCBA), flat composite material, welded metal sheets, and other objects) using industrial CT, a high scanning resolution may be required. In such cases, two main problems arise during scanning the small region: either the target region cannot be scanned at high resolution (close to the source) due to the long extension in one direction, or the target region needs to be cut out for scanning.

The system described herein addresses the aforementioned shortcomings. For example, one or more embodiments of the system herein can include a manipulating unit that can be configured to generate a scanning path around a target object to be scanned and a source configured to follow the generated scanning path. In the present system, by following the scanning path, the source can travel as close to the target object as possible, ensuring that high resolution can be achieved. As used herein, the term "resolution" can generally describe the capability of an imaging system to capture and resolve a feature within an object under inspection such that the feature appears clearer and includes a greater level of detail when viewed on a screen. In X-ray or computed tomography imaging systems the features of the object under inspection can thus be resolved better when the object is placed closer to the source allowing for greater resolution of the imaged features.

The present system solves the problem by moving the source close to the target object. The present system can be configured to enhance the applicability of the CT application for scanning small portions of big objects without destroying the parts and maintaining the highest possible resolution. The system has a wide range of applications, including electronics, flat composite materials, welded metal sheets, welded pipes, and fuel cells.

FIG. 1 is a block diagram of a system for scanning a target object at high resolution (referred to as the system 100). The system 100 can include a scanning unit 102, and a data acquisition unit 114.

The scanning unit 102 can include a manipulating unit 104, a source 106, and a detector 108. In some embodiments, the scanning unit 102 can include a communication circuitry (not shown), and a control unit (not shown). The scanning unit 102 can be configured to acquire data characterizing of the target object 112 or a region of interest (ROI) on the target object 112. In an embodiment, the ROI can be located at the midpoint of the target object 112 or at the boundary of the target object 112. In some embodiments, the target object 112 can be a printed circuit board, flat and/or thin composite material, a welded metal sheet, or the like, which can have one or more dimensions (e.g., length, width, thickness, or the like).

The manipulating unit 104 can be configured to generate a scanning path around the target object 112 to be scanned. In an embodiment, the scanning path can be generated from the point of view of the target object 112. In some embodiments, the scanning path has a shape selected from a group of a helical shape, a double circle shape, a circle shape, a line shape, and/or an abstract shape similar to the shape of the target object 112. In some embodiments, the scanning path can be defined automatically or manually. In some embodiments, the system 100 can be configured to self-train using a set of points selected from the scanning path to generate the scanning path. In an embodiment, the system 100 can be configured to implement a digital twin technology for populating the scanning path automatically. In some embodiments, the system 100 can populate a plurality of scanning path segments with more points (based on user input or automatically) to assure dense sampling of the target object 112. In some embodiments, the scanning path can include a plurality of source poses (a source pose can a combination of position and orientation of the source 106 from the point of view of the target object 112). In an embodiment, the position or/and coordination of the plurality of source poses can be in a 2-dimensional plane and/or in a 3-dimensional plane.

The manipulating unit 104 can be configured to move the source 106 closer to the target object 112, during the motion on the scanning path. In some embodiments, the manipulating unit can be configured to move the source 106 based on predetermined factors such as angular position, shape of the target object 112 to be scanned, shape of the ROI to be scanned, size of the ROI to be scanned, and size of the target object 112 to be scanned. In an embodiment, the manipulating unit 104 can be configured to change at least one geometrical position and the orientation of the target object 112 relative to the source 106. In another embodiment, the manipulating unit 104 can be configured to change at least one geometrical position and the orientation of the target object 112 and the source 106 simultaneously. In some embodiments, the manipulating unit 104 can include a translation component and/or a rotation component to move the source 106 to the plurality of source poses relative to the target object 112. In an embodiment, the manipulating unit 104 and the source 106 can be actuated simultaneously and/or individually, as desired.

The manipulating unit 104 can include a dual axis table, such as an X-Y axis table, and the object 112 can be placed upon the table. The manipulating unit 104 can further include a rotation unit configured to rotate the object 112. The object 112 can be moved on a trajectory path using the manipulating unit 104. During articulation on the trajectory path, the source 106 can be configured to scan the object 112 at different magnifications resulting from varying distances between the source 106 and the object 112 as the object 112 is moved through the trajectory path. In some embodiments, the source 106 and the detector 108 can be provided in fixed locations as the object 112 is translated through the trajectory path. In this way, advantageously, the location of the source 106 and the detector 108 can be known relative to one another. The system herein can be configured to provide positions of the source 106 and the detector 108 that are known relative to one another, for example where the source 106 and the detector 108 are fixed relative to one another or where the source 106 and the detector 108 are translated together such their distance or positions relative to one another are known and fixed as they are translated together.

In some embodiments, the manipulating unit 104 can include a memory. The memory can be configured to store a number of predefined scanning paths corresponding to shape of the target object 112. For example, the shape of the target object 112 can be oval, in this case, a specific oval shaped scanning path can be retrieved from the memory. Further, the manipulating unit 104 can be configured to fetch the relevant scanning path from the memory and populate the scanning path for the source 106 by its own.

The source 106 can be configured to move in the plurality of source poses by the manipulating unit 104 and to follow the generated scanning path. The source 106 can be configured to generate a beam and transmit the beam towards the ROI on the target object 112. In some embodiments, the source 106 can be an X-ray tube. In an embodiment, the width of the generated beam can be changed. In an embodiment, the source 106 can be positioned and oriented in a manner such that the target object 112 always got irradiated.

As the transmitted beam strikes the ROI on the target object 112, the detector 108 can be configured to receive data characterizing of the ROI generated by the beam and generate a scanning data. In an embodiment, the scanning data can represent a geometrical position and orientation of the source 106 from the detector 108 corresponding to each of the plurality of source poses. In an embodiment, the detector 108 can be an X-ray detector. In an embodiment, the source 106 and the detector 108 can be configured to form a source-detector arrangement 110. In an aspect, in the source-detector arrangement 110, the source 106 and detector 108 are placed at a predefined distance. In an embodiment, the dimensions of the source-detector arrangement 110 are either stationary or changeable.

In some embodiments, the scanning unit 102 can be configured to communicate to the data acquisition unit 114 or a user computing device or a server over a network via the communication circuitry. Further, the communication circuitry transmits the generated scanning data over the network. In an embodiment, the network can be a private network, a dedicated network, a public network, a wired network, a wireless telecommunication network, a wireless wide area network (WWAN), a wireless local area network (WLAN), a wireless private network, and a wireless personal area network (PAN). In some embodiments, the communication circuitry may include at least one antenna for transmitting and receiving signals.

In some embodiments, the control unit can be configured to receive command signals from the user computing device or the server via the communication circuitry. Based on the received control signals, the control unit can be configured to generate a plurality of control signals to take appropriate action. For example, the user may intend to change the width of the beam. In such cases, after receiving the command signals, the control unit can send the control signal to the source for changing the width of the beam accordingly.

The data acquisition unit 114 can be communicably coupled to the scanning unit 102 and receives the scanning data from the scanning unit 102. In some embodiments, the data acquisition unit 114 can include a memory 116, an extracting unit 118, an image processor 120, and a display unit 122. The memory 116 can be configured to store received scanning data and the geometrical position and the orientation of the source corresponding to each of the plurality of source poses. In some embodiment, the memory 116 can be configured to store a set of rules for processing the received data. In one embodiment, the memory 116 may include any computer-readable storage medium known in the art including, for example, volatile memory, such as Static Random Access Memory (SRAM) and Dynamic Random Access Memory (DRAM), and/or a non-volatile memory, such as Read Only Memory (ROM), erasable programmable ROM, flash memories, hard disks, optical disks, and magnetic tapes.

The extracting unit 118 can be configured to fetch the scanning data from the memory 116 and further configured to extract pose information from the fetched scanning data. In an embodiment, the pose information can include source detector arrangement information, distance of the detector from the source, detector orientation, and scanning source translation-transversal distance information from the target object 112. The scanning source translation-transversal distance information can describe a distance between the target object 112 and the scanning source 106 as the scanning source 106 translates and traverses the scanning path relative to the target object 112. The source translation-transversal distance information can correspond to location information associated with the scanning source 106 and the detector 108 when the object 112 is in a fixed location for scanning or when the object 112 is moved and the scanning source 106 is in a fixed location. In this way, for any given location of the object 112, a distance between the source 106 and a location of the detector 108 can be known.

The image processor 120 can be communicably coupled to the extracting unit 118. The image processor 120 can be configured to reconstruct the 3D model of the ROI on the target object 112 from the scanning data using the pose information and the source-to-detector arrangement information. In an embodiment, the image processor 120 can be configured to employ number of reconstruction algorithms such as a Feldkamp reconstruction algorithm to reconstruct the 3D model of the target object 112 using the extracted pose information.

The display unit 122 can be configured to display the reconstructed 3D model of the target object 112.

Figure 2:
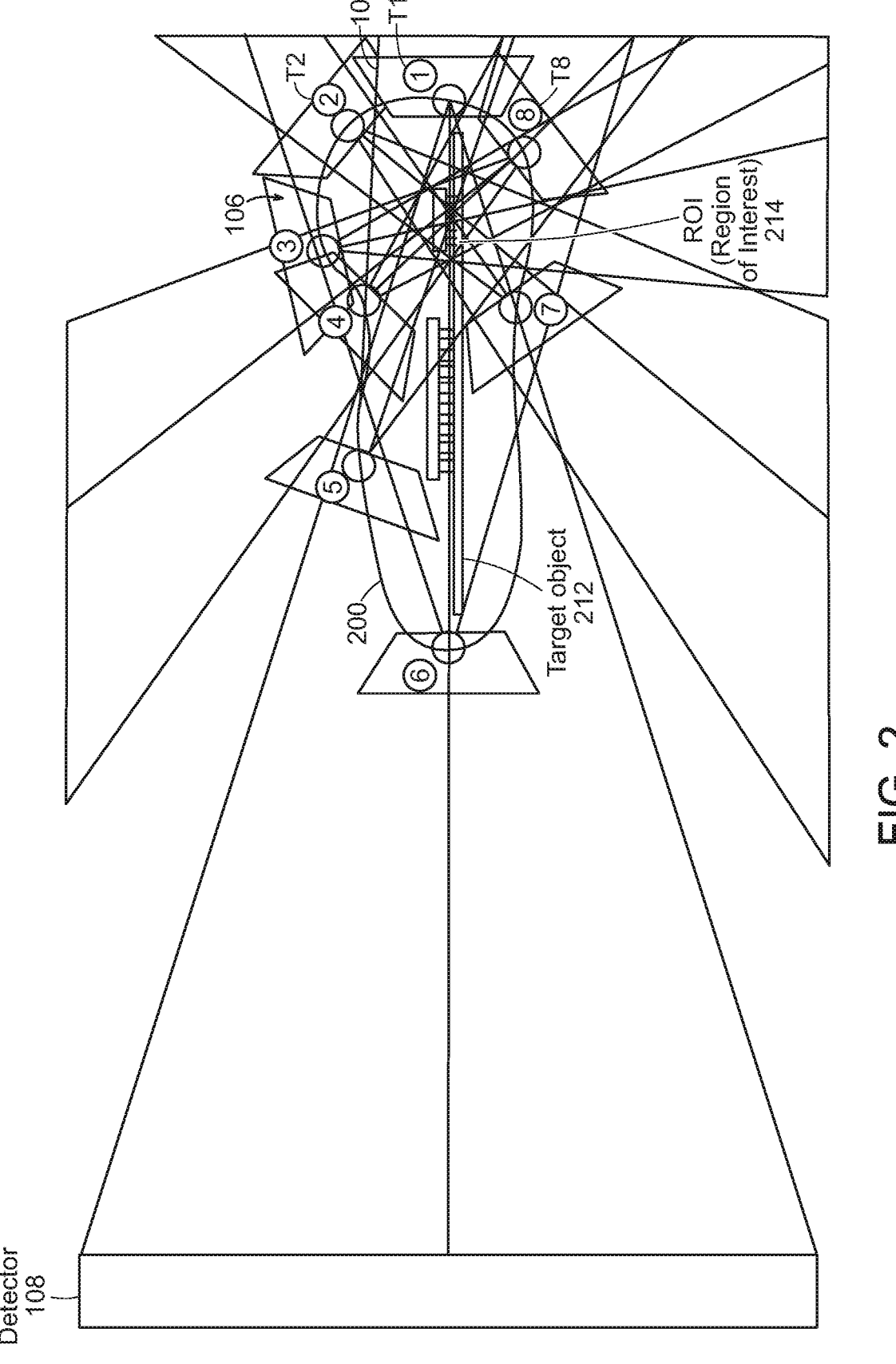
FIG. 2 is a diagram illustrating a scanning path around the target object.

FIG. 2 represents a scanning path 200 around the target object 212, such as a printed circuit board (PCB). The system 100 can be configured to generate the scanning path 200 around the target object 212. The scanning path 200 can be formed from the point of view of the target object 212 in order to capture scanning data associated with a region of interest 214 (e.g., the region of interest 214 can be a location on the underside of a the PCB 212). In some embodiment, the scanning path 200 can be formed by the following considerations:

1) the source 106 or the detector 108 should not hit the ROI 214 or the target object 212 under inspection/scanning. In some embodiments, for the source 106 or the detector 108 to not hit the ROI 214 or the target object 212, data characterizing the source 106, the detector 108, the ROI 214, and/or the target 212 can be stored in the memory prior to scanning the ROI 214 and/or the target 212.

2) the target object 212 can be always imaged on the detector but not the whole part. Only the ROI 214 can be imaged or detected on the detector.

In some embodiments, the scanning path 200 can be defined in advance with a digital twin automatically or manually. The scanning path 200 can include a plurality of points or source poses as shown by T1-T8 in the FIG. 2. For example, there are eight (8) source poses along with the scanning path 200 can be generated. In some cases, the plurality of points can be fixed or variable. At each source pose the source 106 can be arranged relative to the object 212 and the detector 108. For example, in FIG. 2, the detector 108 may not be visible at every source pose T1-8, but is present at every source pose T1-T8. In some embodiments, the detector 108 is in a location that is opposite to the source 106 as shown in regard to T1. In some embodiments, the detector 108 can be positioned at an angle relative to the source 106. In some embodiments, the target object 212 can be rotated and the source 106 and the detector 108 can each be in a fixed location relative to one another as the object 212 is rotated by the manipulating unit 104. In this way, the scanning path 200 and source poses T1-T8 can correspond to positions at which the object 212 is located during its movement or rotation along the scanning path 200 relative to fixed locations of the source 106 and/or the detector 108. Because the manipulating unit 104 is configured to move each of the source 106, the object 212, and the detector 108, the manipulating unit can correlate positions of each of the source 106, the object 212, and the detector 108 in a common coordinate system that can enable inferential determination of the locations of any one of the source 106, the object 212, and/or the detector 108 relative to one another.

Figure 3:
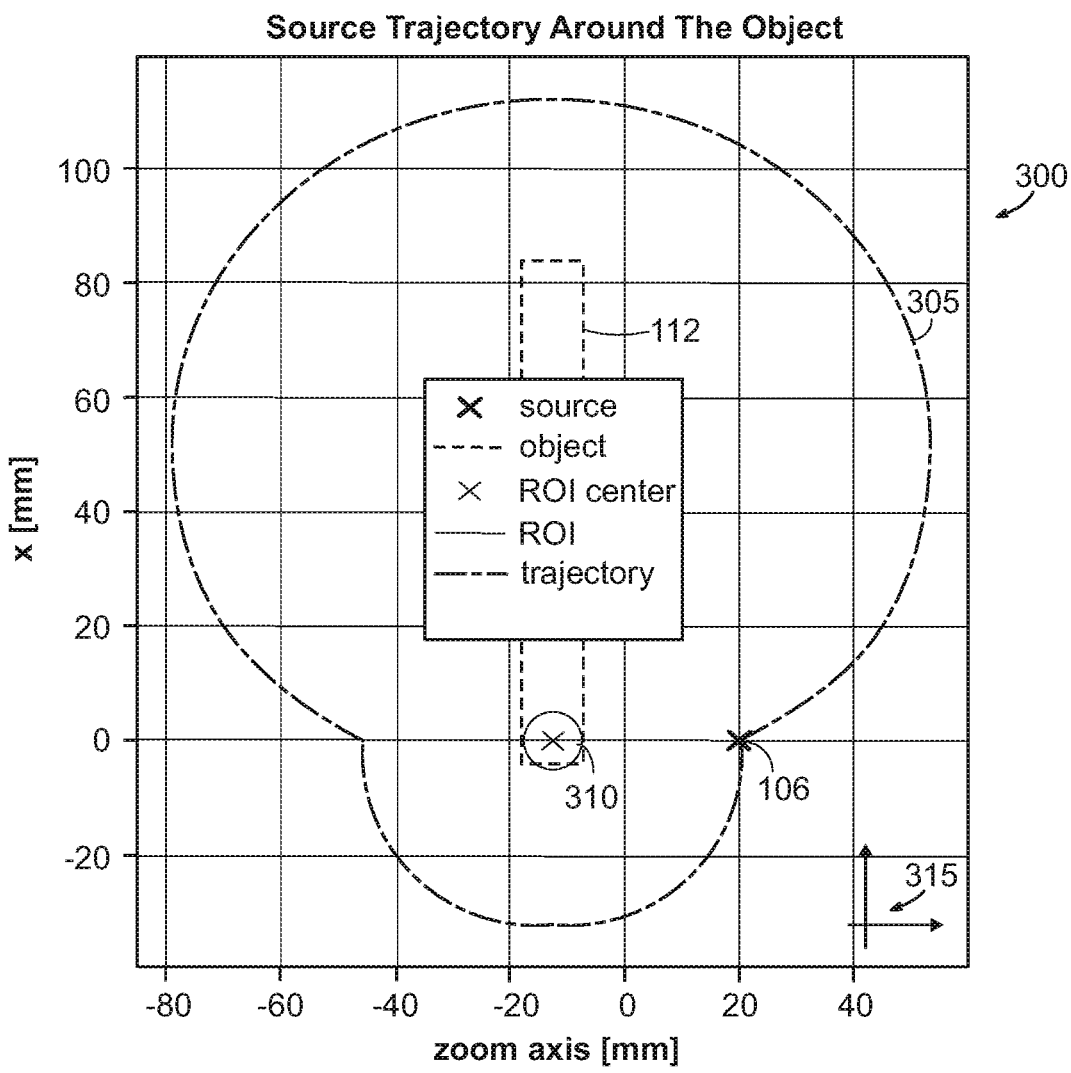
FIG. 3 is a flowchart illustrating one exemplary embodiment of a method for scanning a target object at high resolution using the system of FIG. 1.

As shown in FIG. 3, the system 100 can be configured to provide a user interface 300 including a display of a scanning path 305 of the source 106 with respect to a coordinate system associated with a location of the object 315. The user interface 300 can include a visual representation of the scanning path 305 with respect to a "zoom axis" (e.g., shown as the X axis of the coordinate system associated with the object 315) and a distance axis "x" (e.g., shown as the Y axis of the coordinate system associated with the object 315). In some embodiments, the "zoom axis" can be displayed to be co-linear with respect to an orientation of the source 106 and the detector 108 at a particular source pose. For example, at a first source pose T1 at the beginning of a scanning path 305, the "zoom axis" can be co-linear with a line connecting the source 106 and the detector 108.

The scanning path 305 can display a path or a trajectory traversed by the source 106 as it scans the target object 112. The source 106 can scan the object 112 from a number of source poses located along the scanning path 305 as it traverses around the object 112. In some embodiments, the user interface 300 can include an indication of a region of interest (ROI) 310 and can include an indication of a center of the ROI as shown by the "x" located within the circle of ROI 310.

FIG. 4 is a process flow diagram illustrating an example method 400 for scanning a target object 112 at high resolution. The method 400 can be performed by one or more components of the system 100 of FIG. 1. In method 400, a 3D model of the target object 112 can be reconstructed by moving the source 106 along a scanning path, describing a path around the target object 112.

At 410, a scanning path around the target object 112 to be scanned can be generated by a manipulating unit 104. The scanning path can include or otherwise define a number of source poses associated with a location at which the target object can be scanned by a source 106. The scanning source 106 can be positioned at a first location relative to the target object 112. In some embodiments, the target object can be fixed and the source 106 and/or the detector 108 can traverse along the scanning path. In some embodiments, the target object 112 can be moved or rotated with respect to one or more source poses associated with the scanning path, while the source 106 and/or the detector 108 are in fixed locations relative to the target object 112. The scanning path can have a variety of shapes. For example, the scanning path can have a helical shape, a double circle shape, a circle shape, a line shape and/or an abstract shape replicating the shape of the target object.

In some embodiments, the scanning path can be predefined automatically or manually by a user. In an embodiment, the system 100 can implement a digital twin technology for populating the scanning path automatically. In some embodiments, the system 100 can populate a plurality of scanning path segments with more points (based on user input or automatically) to assure dense sampling of the target object 112. In some embodiments, the generated scanning path can be provided for display by a display unit of the system 100. The plurality of source poses can be defined in a 2-dimensional coordinate system or plane and/or a 3-dimensional coordinate system or plane.

At 420, the target object 112 can be moved by the manipulating unit 104 along the scanning path through the plurality of source poses configured along the scanning path. In an aspect, each of the plurality of source poses can be a combination of position and orientation of the source 106 from the point of view of the target object 112. The manipulating unit can be configured to change the geometrical position and/or the orientation of the target object 112 relative to the scanning source 106.

In some embodiments, the manipulating unit 104 can be configured to move the scanning source 106 or the detector 108 while maintaining the target object 112 in a third location based on one or more of an angular position of the target object relative to the scanning source, a shape of the target object, a shape of the ROI, a size of the ROI, and/or a size of the target object 112. In some embodiments, the source 106 and the detector 108 can be located in fixed positions relative to one another. In some embodiments, the source 106 and the detector 108 can be movable relative to one another.

At 430, a beam can be generated and emitted by the source 106 towards a Region of Interest (ROI) on the target object 112. In some embodiments, the beam can be emitted at locations associated with each source pose defined in regard to the scanning path.

At 440, data characterizing of the ROI generated by the beam can be received by a detector 108. The detector can be positioned opposite to or at an angle relative to the source 106. In some embodiments, the data characterizing of the ROI define the structural aspects of the ROI, including shape, size, location, relative position, contour, or the like. In some embodiments, the system 100 can be configured to generate all the structural data characterizing of the ROI systematically, thereby simplifying the representation.

At 450, a scanning data can be generated by the detector 108. In an embodiment, the scanning data can represent a geometrical position and an orientation of the ROI of the target object 112 at each of the source poses provided along the scanning path. The scanning data from the scanning unit 102 can be received by a data acquisition unit 114.

At 460, pose information can be extracted by an extracting unit 118 of the data acquisition unit 114 of system 100. The pose information can be associated with each of the source poses defined in regard to the scanning path. For example, the pose information can include the first location of the scanning source, the second location of the detector, a distance between the first location of the source and the second location of the detector, an orientation of the detector at the second location, and a scanning source translation-transversal distance from the target object.

At 470, a 3D model of the target object 112 can be reconstructed by an image processor 120 of the data acquisition unit 114 using the extracted pose information. In some embodiments, the image processor 120 can be configured to employ a Feldkamp reconstruction algorithm to reconstruct the 3D model of the target object 112 using the pose information. In some embodiments, the image processor 120 can be configured to employ a derivative of Feldkamp reconstruction algorithm by application of windowing techniques to improve image quality in ROI scans. In some embodiments, the image processor 120 can be configured to employ an algebraic or iterative reconstruction technique.

At 480, the reconstructed 3D model of the target object 112 can be displayed by a display unit 122 of the data acquisition unit 114.

Figure 5:
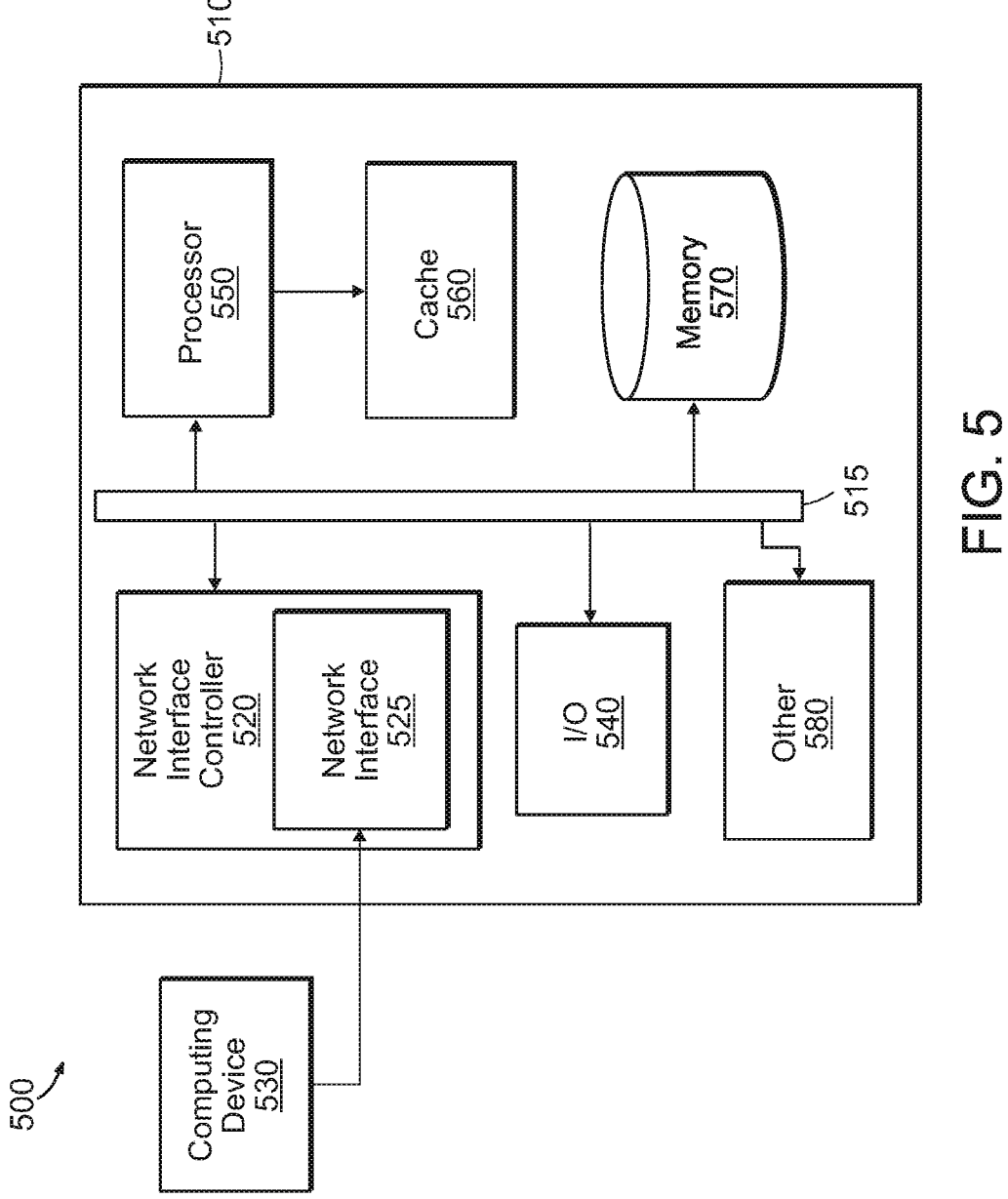
FIG. 5 is a block diagram of an exemplary computing system in accordance with an illustrative implementation of the current subject matter.

FIG. 5 is a block diagram 500 of a computing system 510 suitable for use in implementing the computerized components described herein. In broad overview, the computing system 510 includes at least one processor 550 for performing actions in accordance with instructions, and one or more memory devices 560 and/or 570 for storing instructions and data. The illustrated example computing system 510 includes one or more processors 550 in communication, via a bus 515, with memory 570 and with at least one network interface controller 520 with a network interface 525 for connecting to external devices 530, e.g., a computing device. The one or more processors 550 are also in communication, via the bus 515, with each other and with any I/O devices at one or more I/O interfaces 540, and any other devices 580. The processor 550 illustrated incorporates, or is directly connected to, cache memory 560. Generally, a processor will execute instructions received from memory. In some embodiments, the computing system 510 can be configured within a cloud computing environment, a virtual or containerized computing environment, and/or a web-based microservices environment.

In more detail, the processor 550 can be any logic circuitry that processes instructions, e.g., instructions fetched from the memory 570 or cache 560. In many embodiments, the processor 550 is an embedded processor, a microprocessor unit or special purpose processor. The computing system 510 can be based on any processor, e.g., suitable digital signal processor (DSP), or set of processors, capable of operating as described herein. In some embodiments, the processor 550 can be a single core or multi-core processor. In some embodiments, the processor 550 can be composed of multiple processors.

The memory 570 can be any device suitable for storing computer readable data. The memory 570 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 510 can have any number of memory devices 570.

The cache memory 560 is generally a form of high-speed computer memory placed in close proximity to the processor 550 for fast read/write times. In some implementations, the cache memory 560 is part of, or on the same chip as, the processor 550.

The network interface controller 520 manages data exchanges via the network interface 525. The network interface controller 520 handles the physical, media access control, and data link layers of the Open Systems Interconnect (OSI) model for network communication. In some implementations, some of the network interface controller's tasks are handled by the processor 550. In some implementations, the network interface controller 520 is part of the processor 550. In some implementations, a computing device 510 has multiple network interface controllers 620. In some implementations, the network interface 525 is a connection point for a physical network link, e.g., an RJ 45 connector. In some implementations, the network interface controller 520 supports wireless network connections and an interface port 525 is a wireless Bluetooth transceiver. Generally, a computing device 510 exchanges data with other network devices 530, such as computing device 530, via physical or wireless links to a network interface 525. In some implementations, the network interface controller 520 implements a network protocol such as LTE, TCP/IP Ethernet, IEEE 802.11, IEEE 802.16, Bluetooth, or the like.

The other computing devices 530 are connected to the computing device 510 via a network interface port 525. The other computing device 530 can be a peer computing device, a network device, a server, or any other computing device with network functionality. In some embodiments, the computing device 530 can be a network device such as a hub, a bridge, a switch, or a router, connecting the computing device 510 to a data network such as the Internet.

In some uses, the I/O interface 540 supports an input device and/or an output device (not shown). In some uses, the input device and the output device are integrated into the same hardware, e.g., as in a touch screen. In some uses, such as in a server context, there is no I/O interface 540 or the I/O interface 540 is not used. In some uses, additional other components 580 are in communication with the computer system 510, e.g., external devices connected via a universal serial bus (USB).

The other devices 580 can include an I/O interface 540, external serial device ports, and any additional co-processors. For example, a computing system 510 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations, an I/O device is incorporated into the computing system 510, e.g., a touch screen on a tablet device. In some implementations, a computing device 510 includes an additional device 580 such as a co-processor, e.g., a math co-processor that can assist the processor 550 with high precision or complex calculations.

The subject matter described herein can provide many technical advantages. For example, it can facilitate a scanning system 100 and methods of operation of the scanning system that generate and operate with respect to a scanning path to perform ROI scans on a target object. In this way, scanning of the ROI on the target object can be accomplished more easily and at higher resolutions as compared with standard scanning systems using more limited scanning geometries. The subject matter herein can enable scanning ROIs of flat objects at higher resolutions through a 360 degrees of rotation. As such, the system and methods herein can define a sophisticated and comprehensive scanning trajectory for complex shaped parts while acquiring image data high resolution for features present within a ROI.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A system comprising:
   a scanning unit comprising
      a manipulating unit, comprising a first memory storing a plurality of pre-determined scanning paths corresponding to a shape of a target object to be scanned, the predetermined scanning paths including a plurality of source poses identifying locations at which the target object is to be scanned and defined with respect to a digital twin of the target object, the manipulating unit configured to generate a scanning path from the plurality of pre-determined scanning paths,
      a scanning source configured to emit a beam toward a region of interest (ROI) on the target object based on the locations defined in the plurality of source poses, and
      a detector configured to receive data characterizing the ROI and to generate scanning data representing a geometrical position and an orientation of the region of interest of the target object; and
   a data acquisition unit communicably coupled to the scanning unit and configured to receive the scanning data, the data acquisition unit including at least one data processor and a second memory storing non-transitory computer readable instructions, which when executed by the at least one data processor cause the scanning unit to perform operations including
      causing, by the manipulating unit, the scanning source to traverse the locations defined in the plurality of source poses;
      moving, by the manipulating unit, the target object relative to the locations of the scanning source defined in the plurality of source poses;
      emitting, by the scanning source, the beam towards a region of interest on the target object at each location defined in the plurality of source poses;

receiving, by a detector positioned opposite the scanning source, data characterizing the ROI based on the emitted beam;

generating, by the detector, scanning data representing a geometrical position and an orientation of the ROI of the target object for each source pose of the plurality of source poses; and transmitting, by the detector, the scanning data to the data acquisition unit, wherein, responsive to receiving the transmitted scanning data, the instructions are further configured to cause the data acquisition unit to extract, via an extracting unit of the data acquisition unit, pose information based on the plurality of source poses, construct, by an image processor of the data acquisition unit, a 3D model of the target object using the pose information and the scanning data; and displaying, by a display unit of the data acquisition unit, the 3D model of the target object.

2. The system of claim 1, wherein the pose information comprises the location of the scanning source, the location of the detector, a distance between the location of the scanning source and the location of the detector, an orientation of the detector at the location at which the data characterizing the ROI is received, and a scanning source translation-transversal distance from the target object.

3. The system of claim 1, wherein the plurality of source poses are defined in a 2-dimensional plane and/or a 3-dimensional plane.

4. The system of claim 1, wherein the manipulating unit is alternatively configured to move the scanning source or the detector while maintaining a position of the target object based on one or more of an angular position of the target object relative to the scanning source, a shape of the target object, a shape of the ROI, a size of the ROI, and/or a size of the target object to be scanned.

5. The system of claim 1, wherein the manipulating unit is configured to change the geometrical position and/or the orientation of the target object relative to the scanning source.

6. The system of claim 1, wherein the location of the scanning source and/or the location of the detector are movable relative to one another.

7. The system of claim 1, wherein the location of the scanning source and/or the location of the detector are fixed relative to one another.

8. The system of claim 1, wherein the scanning path has a shape including at least one of a helical shape, a double circle shape, a circle shape, a line shape and/or an abstract shape replicating the shape of the target object.

9. The system of claim 1, wherein the image processor is configured to employ a Feldkamp reconstruction algorithm to reconstruct the 3D model of the target object using the pose information.

10. The system of claim 1, wherein the instructions are further configured to cause the manipulating unit to provide the generated scanning path for display via the display unit.

11. A method comprising:

generating, by a manipulating unit having a memory storing a plurality of predetermined scanning paths corresponding to a shape of a target object to be scanned, the predetermined scanning paths including a plurality of source poses identifying locations at which the target object is to be scanned and defined with respect to a digital twin of the target object, a scanning path from the plurality of pre-determined scanning paths;

causing, by the manipulating unit, a scanning source to traverse the locations defined in the plurality of source poses;

moving, by the manipulating unit, the target object relative to the locations of the scanning source defined in the plurality of source poses;

emitting, by the scanning source, a beam towards a region of interest (ROI) on the target object at each location defined in the plurality of source poses;

receiving, by a detector positioned opposite the scanning source, data characterizing the ROI based on the emitted beam;

generating, by the detector, scanning data representing a geometrical position and an orientation of the ROI of the target object for each source pose of the plurality of source poses;

extracting, by an extracting unit, pose information based on the plurality of source poses;

constructing, by an image processor, a 3D model of the target object using the pose information and the scanning data; and displaying, by a display unit, the 3D model of the target object.

12. The method of claim 11, wherein the pose information comprises the location of the scanning source, the location of the detector, a distance between the location of the scanning source and the location of the detector, an orientation of the detector at the location at which the data characterizing the ROI is received, and a scanning source translation-transversal distance from the target object.

13. The method of claim 11, wherein the plurality of source poses are defined in a 2-dimensional plane and/or a 3-dimensional plane.

14. The method of claim 11, wherein the manipulating unit is alternatively configured to move the scanning source or the detector while maintaining a position of the target object based on one or more of an angular position of the target object relative to the scanning source, a shape of the target object, a shape of the ROI, a size of the ROI, and/or a size of the target object to be scanned.

15. The method of claim 11, wherein the manipulating unit is configured to change the geometrical position and/or the orientation of the target object relative to the scanning source.

16. The method of claim 11, wherein the location of the scanning source and/or the location of the detector are movable relative to one another.

17. The method of claim 11, wherein the location of the scanning source and/or the location of the detector are fixed relative to one another.

18. The method of claim 11, wherein the scanning path has a shape including at least one of a helical shape, a double circle shape, a circle shape, a line shape and/or an abstract shape replicating the shape of the target object.

19. The method of claim 11, wherein the image processor is configured to employ a Feldkamp reconstruction algorithm to reconstruct the 3D model of the target object using the pose information.

20. The method of claim 11, wherein generating the scanning path further comprises providing the scanning path for display via a display unit.

* * * * *